(12) United States Patent
Everett

(10) Patent No.: US 8,886,932 B2
(45) Date of Patent: Nov. 11, 2014

(54) MESSAGE STORAGE AND TRANSFER SYSTEM

(75) Inventor: David Everett, Rustington (GB)

(73) Assignee: Royal Canadian Mint/Monnaie Royale Canadienne, Ottawa (CA)

( * ) Notice: Subject to any disclaimer, the term of this patent is extended or adjusted under 35 U.S.C. 154(b) by 151 days.

(21) Appl. No.: 13/637,328

(22) PCT Filed: Mar. 14, 2011

(86) PCT No.: PCT/CA2011/050138
§ 371 (c)(1),
(2), (4) Date: May 21, 2013

(87) PCT Pub. No.: WO2011/120158
PCT Pub. Date: Oct. 6, 2011

(65) Prior Publication Data
US 2013/0246787 A1    Sep. 19, 2013

(30) Foreign Application Priority Data

Mar. 30, 2010  (CA) ................. PCT/CA2010/000435
Sep. 17, 2010  (CA) ..................................... 2714784

(51) Int. Cl.
*H04L 29/06*    (2006.01)
*H04M 1/24*    (2006.01)

(52) U.S. Cl.
USPC ............................................ 713/164; 379/1

(58) Field of Classification Search
CPC ..... H04L 9/32; H04L 9/3271; H04L 12/6418; H04L 9/3247; H04L 2209/56; H04L 2209/60; G06Q 20/20; G06Q 20/10; G06Q 20/123; G06Q 30/06
USPC .......... 713/164–167, 152, 191, 16; 379/1, 15, 379/207; 705/52
See application file for complete search history.

(56) References Cited

U.S. PATENT DOCUMENTS 4,211,919 A  *  7/1980  Ugon ............................ 235/487
5,623,547 A       4/1997  Jones et al.
(Continued)

FOREIGN PATENT DOCUMENTS

JP      2003044769 A    2/2003
WO       9632700 A1    10/1996
(Continued)

OTHER PUBLICATIONS

Chaum, et al., "Blind Signatures for Untraceable Payments", Advances in Cryptology Proceedings of Crypto 82, D.Chaum, R.L. Rivest & A.T. Sherman (Eds), Plenum, pp. 199-203.

*Primary Examiner* — Abu Sholeman
(74) *Attorney, Agent, or Firm* — Pearne & Gordon LLP

(57) ABSTRACT

An electronic content exchange system includes a communications medium and at least two storage media. Each storage media includes an interface configured to send and receive messages, a memory storing a current content, a respective unique identifier, and a log of content transfers; and a controller. The controller receives a content transfer message including at least a message content to be transferred, and executes a Transfer-in process to increase the current content by the message content to be transferred and record information of the transfer in the log. The controller receives, via the interface, a content transfer request message including at least a message content to be transferred, and executes a Transfer-out process to generate and send a content transfer message including the message content to be transferred, decreasing the current content by the message content to be transferred; and recording information of the transfer in the log.

15 Claims, 7 Drawing Sheets

(56) References Cited

U.S. PATENT DOCUMENTS

| | | | |
|---|---|---|---|
| 5,761,308 A * | 6/1998 | Torii et al. | 705/52 |
| 5,778,067 A | 7/1998 | Jones et al. | |
| 6,047,045 A * | 4/2000 | Bauer et al. | 379/26.01 |
| 6,142,369 A | 11/2000 | Jonstromer | |
| 7,721,108 B2 | 5/2010 | Pailles et al. | |
| 7,992,792 B2 | 8/2011 | Van Rensburg | |
| 2002/0010679 A1 | 1/2002 | Felsher | |
| 2003/0023854 A1 * | 1/2003 | Novak et al. | 713/182 |
| 2004/0034601 A1 * | 2/2004 | Kreuzer | 705/52 |
| 2006/0085505 A1 * | 4/2006 | Gillum et al. | 709/206 |
| 2006/0168447 A1 | 7/2006 | Pailles et al. | |
| 2007/0009230 A1 * | 1/2007 | Tanaka | 386/94 |
| 2007/0198422 A1 * | 8/2007 | Prahlad et al. | 705/52 |
| 2008/0306872 A1 | 12/2008 | Felsher | |
| 2009/0106547 A1 * | 4/2009 | Yokota et al. | 713/156 |
| 2009/0125429 A1 * | 5/2009 | Takayama | 705/35 |
| 2009/0216842 A1 * | 8/2009 | Risher et al. | 709/206 |
| 2009/0287837 A1 | 11/2009 | Felsher | |
| 2010/0133337 A1 | 6/2010 | Van Rensburg | |
| 2010/0235650 A1 * | 9/2010 | Serret-Avila et al. | 713/189 |
| 2010/0241595 A1 | 9/2010 | Felsher | |
| 2013/0046824 A1 * | 2/2013 | Park et al. | 709/204 |

FOREIGN PATENT DOCUMENTS

| | | |
|---|---|---|
| WO | 2008075143 A1 | 6/2008 |
| WO | 2011032257 A1 | 3/2011 |
| WO | 2011032271 A1 | 3/2011 |

* cited by examiner

MESSAGE STORAGE AND TRANSFER SYSTEM

TECHNICAL FIELD

The present invention relates to a system for securely storing and moving message contents between storage media held by participants in a communications system.

BACKGROUND

In the modern telecommunications space, there are numerous scenarios in which it is desirable to be able to securely store and exchange message content between parties. Scenarios in which this type of functionality is desired include, but are not limited to: electronic commerce, in which the message content may include an asset value or monetary amount; electronic voting, in which the message content may include a voter's election; and remote telemetry, in which the message content may include sensor data and/or control commands.

In all such scenarios, message content is stored in a storage media that is "owned" by a party, and it is desired to transfer or send that message content to a storage media "owned" by another party. The storage media in each case may take any desired form including, for example, a non-volatile memory. The parties involved may be actual people or organizations, or, particularly in the case of remote telemetry systems and the like, an identified station or piece of equipment.

In the context of the present specification, the secure storage and exchange of message contents means that the mechanism for storing and exchanging message content reflects or embodies at least some of the following values:

Security: it should be computationally infeasible for a party to obtain unauthorized access to message content within a store. Similarly, in a case where a party improperly receives message content addressed to another party, it should be computationally infeasible for the receiving party to improperly store that message content to their own storage media.

Irrevocability: When message content is to be transferred from one party to another, a message may be generated which contains the desired message content. The message generation mechanism should preferably operate in such a manner that the message cannot subsequently be revoked by the sending party.

Non-repudiation: A message containing content to be transferred from a sending party to a receiving party should be tagged in such a manner that the sending party cannot plausibly assert that the message was generated and sent by some other party;

Anonymity: The storage and transfer mechanism should operate in such a manner that parties can exchange message content without the intervention of a third party that has knowledge of the identities of the parties to the actual exchange;

Duplicate detection: The message content transfer mechanism should preferably operate in which a way that duplicate messages are detected and handled properly.

It may be noted that it is not essential for all of the above-described values to be present. For example, in some remote telemetry scenarios, the value of "anonymity" may be undesirable, because the identity of the station or equipment that has sent a message may be useful to the recipient. On the other hand, in some cases this anonymity may be useful in that an unauthorized party that improperly receives a content transfer message cannot determine the identity of the sending party by analysing the message. In a remote telemetry scenario, for example, this may prevent a hacker from correlating intercepted telemetry data to the particular station or equipment that sent it. Similarly, in an on-line voting system, anonymity enables the implementation of "secret voting", while the other virtues of irrevocability, non-repudiation, and duplicate detection allows detection and prevention of election fraud.

In the field of electronic commerce, electronic payment systems are known in the art. A common example of such systems uses a "debit card" issued by a bank to its customers. In a simple transaction, the customer inserts their card into an automated teller machine (ATM), which uses information stored on the card to access the customer's account at the bank. The customer will often be required provide a secret Personal Identification Number (PIN) so that the bank may be assured of the authenticity of the card holder. Upon successful completion of the authentication process, the customer can request various types of transactions, such as cash withdrawals or transfers to another account.

Merchant's Point-of Sale (POS) devices may also be equipped to handle debit-card transactions. In this case, the debit card is inserted into a POS terminal, which uses information stored on the card to initiate a communication session with the customer's bank and send a message to the bank requesting the transfer of a sum of money from the customer's bank account to the merchant's bank account (at the same or a different bank). Upon successful completion of the bank's authentication process (again using the PIN), the bank will verify whether the customer's account contains sufficient funds, and if so the bank will execute the requested transaction.

Credit cards are often used in a directly analogous manner, but in the case of a credit card, the customer's account is a credit facility against which the customer is charged interest on any outstanding balance.

A problem with debit and credit cards is that banks and other card-issuing authorities often levy significant charges or fees for using the card. These fees may be charged to the cardholder, the merchant, or both, depending on the card-issuer's policies. Often, these fees are levied on a per-transaction basis, and significantly increase the costs of doing business for both merchants and card holders.

Another problem with the use of debit and credit cards is that transactions cannot normally be performed in an anonymous manner. That is, the transaction cannot be completed without the intervention of a third party (eg a bank or card-issuer) who knows the identities of both the card-holder and the merchant, and this information is recorded as part of the transaction. While this provides a means of ensuring security and integrity of the system, it also enables the card issuer to compile a detailed record of the card-holder's purchasing history. This record can be mis-used in various ways, without the knowledge or (informed) consent of the card-holder. Accordingly, in many situations consumers would prefer to be able to make payments in an anonymous fashion.

A still further limitation of debit and credit cards is that the card-holder authentication process (entering of the PIN) slows down the process by which a transaction can be requested. This means that debit and credit cards are poorly suited to situation where it is desired to make a very small-valued transaction with minimum delay. Typical examples of such transactions include payment of a bus or subway fare.

What is required is an electronic payments system that more closely resembles the use of cash, in that it does not obviously incur costs when used for payments and enables a user to make anonymous transactions. A particular characteristic of cash is that it operates without reference to any third party, only the sender and the recipient are involved in a particular transaction.

David Chaum addressed some of these issues in "Blind Signatures for Untraceable Payments," D. Chaum, Advances in Cryptology Proceedings of Crypto 82, D. Chaum, R. L. Rivest, & A. T. Sherman (Eds.), Plenum, pp. 199-203. The idea behind Chaum's work was the concept of a blind digital signature that allowed the creation of electronic bills. A bank for example could create an electronic message protected by a digital signature that would represent the value of say a dollar bill. The digital signature would identify the bank as the issuer of the bill but not the consumer who gets the dollar bill from the bank. In order to make a payment to a merchant the consumer would need to give the merchant a set of these electronic dollar bills representing the cumulative value of the goods. It is clear that the consumer would also need electronic messages representing each coin value from 1 cent to a dollar in the US currency for example.

Apart from the difficulty of managing a suitable set of electronic bills it is clear that it would be easy for a fraudster to make copies of an otherwise genuine electronic dollar bill. It would not be possible to tell the difference between the original digitally signed message and a copy of this message so the system operates in such a way that the issuing bank only accepts the first copy of the bill presented, other copies, perhaps even the correctly authorized version would be rejected. In practice this means that Chaum's scheme has to operate on-line where the merchant can be connected to the issuing bank to be re-assured that payment will be made. Although the scheme looks like a local asset transfer system it cannot in practice be used that way because of the risk of fraud.

U.S. Pat. Nos. 5,623,547 and 5,778,067 describe a system in which users are provided with electronic purses which can be used to store asset value. A bank (or other issuing authority) maintains a special bulk purse, to manage the total amount of asset value in circulation within the system. Asset value can be exchanged between the bulk purse and other purses, and between electronic purses, using a 4 message protocol where each message is digitally signed. This protocol is designed to ensure that duplicate payments are avoided. A limitation of this system is that both parties to a transaction must possess an electronic purse and the means to implement the electronic value transfer protocol. A further limitation is that the four message protocol increases the time required to make a value transfer, which might be unacceptable in some applications such as fare payment in a mass transit system, for example.

An electronic message content storage and transfer system that overcomes at least some of the limitations of the prior art remains highly desirable.

SUMMARY

Accordingly, the present invention sets out to provide a message content storage and transfer system that enables implementation of a practical electronic payment scheme more closely aligned with the use of cash in the physical environment but which is also capable of operating where the participants are remotely located only connected by some electronic cable or wireless interface. It is a particular feature of such an electronic payment scheme that it can be used for micropayments without incurring substantial transaction fees. These micropayments relate particularly to the use of the internet and mobile phones where consumers might pay a few cents for electronic content such as music recordings or information which has content value.

Thus an aspect of the present invention provides a message content store and transfer system comprising: a plurality of storage media, each storage media including: a respective unique identifier; a memory for storing a current content and a log of transfer messages; and a controller for controlling transfers of content to and from the storage media. The controller transfers content from the storage media by: generating and sending an encrypted content message including at least a selected message content to be transferred from the storage media, the respective unique identifier of the storage media as sender, and a respective unique identifier of a recipient; decreasing the current content by the selected message content; and recording information of the content message in the log. The controller transfers or stores content to the storage media by: receiving an encrypted content message including at least a selected message content to be transferred to the storage media; a respective unique identifier of a sender; and the respective unique identifier of the storage media as recipient; decrypting the received content message; increasing the current content by the selected message content; and recording information of the content message in the log.

In an electronic commerce context, the storage media may be referred to as an electronic purse (e-Purse); the current content stored in the memory may be an accumulated asset value or monetary amount; and the message content of a content message may be an asset value or monetary amount to be transferred.

According to the invention there is a message transfer system involving a plurality of storage media which store the content of the owner held within the system. A particular participant or party in the system may have one or more storage media. These storage media are constructed in a secure environment such that it is not economically viable for a fraudster to manipulate the content held in the storage media.

A feature of the content transfer system is the way in which it prevents the replay of duplicate messages which might be used to defraud the system. The digitally signed message that is used to implement the content transfer from one storage media to another has the particular property that it is unique and it is also contains information that identifies both the sender storage media and the recipient storage media. The sender storage media also adds a nonce or additional information to ensure the message is unique. Each storage media includes a log that represents every content transfer message created or received by that storage media in the currently valid security domain. The security domains in the storage media may change from time to time as determined by the operators of the scheme. The transaction log of transfer messages may be reduced by using collision free hash functions in order to reduce the amount of memory required for storage and the time expended in testing for duplicate messages. In operation the processing device attached to the recipient storage media checks that the received content message has not already been acted upon before incrementing the content stored in its memory.

In many practical payment scenarios the recipient which for example could be a merchant may not have a locally held storage media. This is however not a problem of this system because the merchant would only require knowledge of the sender's public key to check the digital signature of a content message and could also provide the sender storage media and processor with a nonce or other information to ensure the property of uniqueness in the digitally signed content message. These content messages can be sent to the merchant's remote storage media at a later point in time such that the merchant's terminal could operate in a total off-line mode without the need of handling secret cryptographic keys The anonymity of electronic low value payment transactions in particular are difficult to achieve in practice. It is a characteristic of this system that sender storage media is identified within the system, but there is no need for the owner of that storage media to be similarly identified. Furthermore, content can be exchanged in a point-to-point transfer between sender and recipient storage media, without the intervention or involvement of any third party who is aware of the identities of the owners of the involved storage media. This enables owners of storage media to securely store and exchange content, while maintaining their anonymity.

The content messages of the present invention are considered to be irrevocable in that once a storage media and its processor have created a digitally signed content message the content stored in the memory of that storage media is decremented by the content defined in the transfer message. Content exchange transactions cannot be cancelled nor can transfer messages be created for content different or greater than that stored in the memory of the storage media. In the event of a dispute the sender may choose to solicit a return of content from the recipient by whatever means is deemed appropriate to both parties, but the initial transfer of content cannot be revoked unilaterally by the sender.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

The present invention provides methods and apparatus for electronic message content storage and transfer. Embodiments of the invention are described below, by way of example only, with reference to FIGS. 1-7.

In the following description, the present invention will be described by way of an embodiment in which the secure storage and transfer mechanism is used to enable electronic commerce via the secure storage and exchange of message content in the form of an asset value or a monetary amount. However, it will be recognised that the present invention is not limited to electronic commerce, but rather that the same techniques may be used to implement any communications system in which the values of at least Security, Irrevocability, Non-repudiation and Duplicate Detection are desired.

Figure 1A:
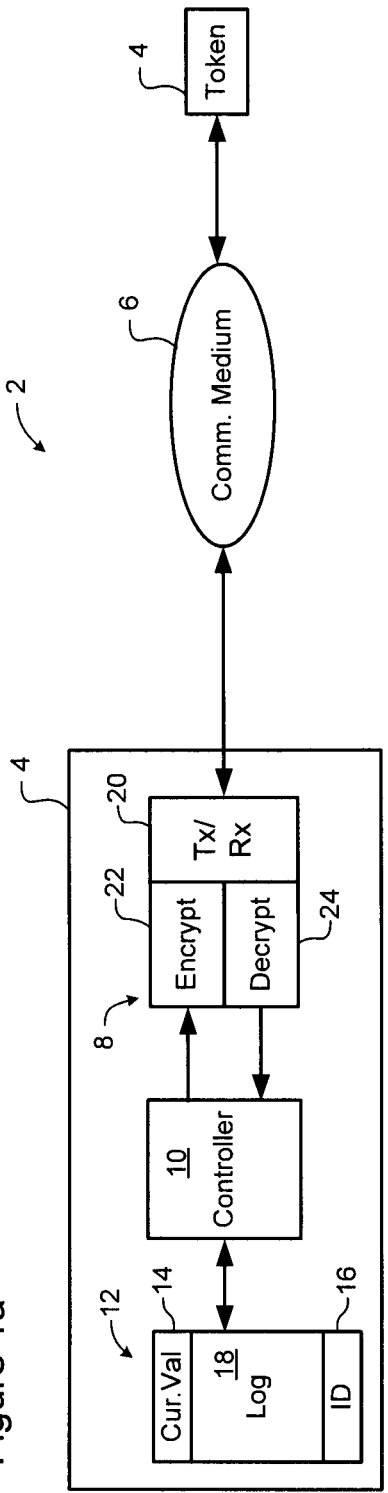
FIG. 1a is a block diagram schematically illustrating a content exchange system in accordance with an embodiment of the present invention.

Referring to FIG. 1a, in very general terms, an asset exchange system 2 in accordance with the present invention comprises at least two storage media 4 configured to exchange messages through a communications medium 6. In an electronic commerce context, a storage media 4 may be referred to as an electronic purse (e-Purse), and this terminology will be used in the following description. Each e-Purse 4 comprises an interface 8 configured to enable the e-Purse 4 to send and receive messages through the communications medium 6; a controller 10 responsive to received messages to record transfers of content to the e-Purse 4 and to transfer content from the e-Purse 4; and a memory 12 storing a current content (Cur.Val) 14, a respective unique identifier 16 of the e-Purse and a log 18 of content transfers to and from the e-Purse 4e. In an electronic commerce context, a storage media 4 may be referred to as an electronic purse (e-Purse), the content of messages represents an asset or monetary value amount, and the current content (Cur.Val) 14 stored in the memory 12 is an accumulated asset or monetary value amount. For ease of understanding, this terminology will be used in the following description.

In addition to message transmission and reception functions 20, the interface 8 preferably also implements encryption 22 and decryption functions 24, such that messages sent by the e-Purse are digitally signed (encrypted) prior to being sent, and messages received by the e-Purse can be validated (decrypted). Encryption and decryption functions suitable for use in this manner are well known in the art.

As is known in the art, conventional Public Key Infrastructure (PKI) security systems operate by generating and assigning a pair of keys, which are commonly referred to as a "private" key and a "public" key, to each party. The private key is maintained in secrecy by the party, and is used to encrypt files prior to their being sent to another party. The public key is sent to the recipient, and enables them to decrypt the file. In some systems, the private key is not used to encrypt the file itself, but rather is used to apply a digital signature to the file. In this case, the public key enables the recipient to verify that the file has not been modified (or corrupted) prior to its arrival, and also provides the receiving party with a reason to believe that the file was actually sent from the alleged sending party.

In some embodiments, the encryption and decryption functions implemented by the interface 8 use the private key/public key system to digitally sign and verify asset value transfer messages sent and received by the e-Purse 4. In this case, each e-Purse 4 may be provided with a unique private key/public key pair, of which at least the public key is certified by a trusted Certification Authority in a manner known in the art. Known means can be used to store the keys such that it is impractical to discover the keys by reverse-engineering or hacking the e-Purse. In operation, the encryption function of the interface uses the "private" key to digitally sign asset value transfer messages sent by the e-Purse, and the decryption function uses the "public" key to verify asset value transfer messages received by the e-Purse. Asset value transfer messages sent by the e-Purse may also be accompanied by, or include, the e-Purse's public key certificate. By this means, an e-Purse receiving the asset value transfer message can first check the authenticity of the public key before checking the signature by possession of the public key.

In some embodiments, the e-Purse is implemented as a physical article. In such cases, the memory 12 is provided as a non-volatile random access memory (RAM), the controller 10 can be implemented as an integrated circuit operating in accordance with suitable firmware, and the interface 8 may be designed to enable communications via either electrical or wireless connections. If desired, the memory 12, controller 10 and at least the encryption/decryption functions 22, 24 of the e-Purse 4 can be implemented within a single Application Specific Integrated Circuit (ASIC). If desired, an e-Purse 4 can be constructed using known Subscriber Identity Module (SIM) techniques. A physical e-Purse can be designed using any suitable form-factor. For example, form-factors commonly used for removable memory devices (including, but not limited to Memory-stick™, and so-called "thumb-drive" devices) of computers and digital cameras may be used. Other suitable form-factors may be used, as desired, including smart cards and key-fobs, for example. Alternatively, an e-Purse 4 may be constructed in the form of a conventional SIM card and having an electrical interface, for installation in a socket provided for that purpose in a wireless communications device (such as, for example, a cell phone, personal digital assistance (PDA) etc.). Such an arrangement is beneficial in that it enables the e-Purse 4 to be semi-permanently installed in the communications device, which increases convenience for the user.

Figure 1B:
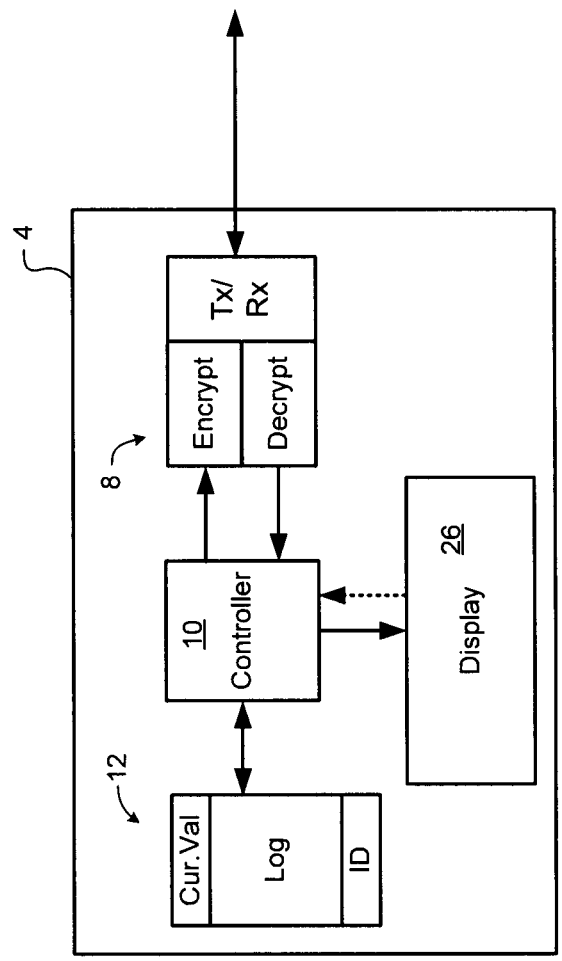
FIG. 1b is a block diagram schematically showing principal elements of a storage media in accordance with an embodiment of the present invention.

Referring to FIG. 1b, in some embodiments, a physical e-Purse may include a display 26 operatively connected to the controller 10, for displaying information such as, for example, the current asset value amount stored in memory 12. In some embodiments, the display 26 may be implemented as a so-called "touch screen", which enables a user to input commands to the controller 10. Alternatively, buttons or switches may be provided on the physical e-Purse for this purpose. In such cases, the controller 10 may execute software implementing a graphical user interface (GUI) which enables a user to interact with the controller 10 to perform various functions including, but not limited to, displaying all or part of the log 18 of asset transfers stored in memory 12, displaying the current asset value amount stored in memory 12, and displaying a status of the e-Purse 4.

In the case of physical e-Purses having an electrical connector-type interface 8, it is anticipated that the configuration of the electrical connector will be selected based at least in part, on the form factor of the e-Purse as whole. For example, in some cases, a socket connector conforming to the Universal Serial Bus (USB) standard may be used. Other electrical connector configurations may be used, as desired. In the case of physical e-Purses having a wireless connection interface, it is preferable that the wireless connection be operative over a very limited distance (e.g. on the order of 10 cm or less), so as to reduce power requirements and enhance security. Various known radio-frequency electromagnetic or magnetic coupling techniques may be used to implement a wireless connection at this distance.

If desired, a battery may be used to provide at least some of the electrical power required by the various components of the physical e-Purse, in a manner well known in the art. Preferably, the interface 8 also provides a path for supplying power to the e-Purse to enable operation of the interface 8, controller 10 and memory 12. In the case of e-Purses having an electrical connector-type interface, it is a simple matter to provide ground and +Vdd contacts as part of the connector. In the case of e-Purses having a wireless connector-type interface, the interface preferably includes a rectifier for converting received wireless energy to electrical power in a manner known in the art. By suitable design of the interface 8, controller 10 and memory 12, power requirements of the e-Purse 4 can be made low enough that rectifying received wireless energy in this manner yields sufficient electrical power for reliable operation of the e-Purse 4, either alone or in combination with battery power. Since the available power varies inversely as the square of the distance between the e-Purse 4 and a wireless terminal, this arrangement can serve as an effective means of limiting the maximum distance over which wireless connection to the e-Purse 4 can be made.

In some embodiments, the e-Purse 4 is implemented as a virtual e-Purse hosted by a secure server. In such cases, the memory may be implemented as a database record, while the server provides the interface 8 and controller 10 functionality using suitable software. Virtual e-Purses may be used by, for example, a broker as a means of managing multiple client accounts.

Figure 2A:
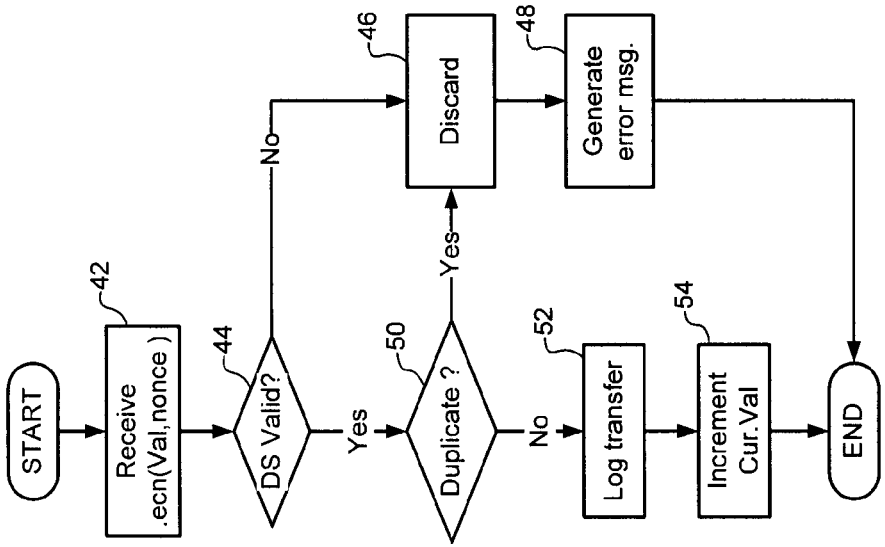
FIGS. 2a and 2b are flow charts showing "Transfer-in" and "Transfer-out" processes in accordance with an embodiment of the present invention.

As noted above, the controller 10 is responsive to received messages to record transfers of asset value to the e-Purse 4 and to transfer asset value from the e-Purse 4. FIG. 2a is a flow-chart showing a representative "transfer Out" process which may be executed by the e-Purse to transfer asset value from the e-Purse. Referring to FIG. 2a, the transfer-out process begins with reception (at 28) of a request message containing the asset value amount (Val.) to be transferred. At a first step (at 30), the controller 10 compares the asset value amount (Val.) to be transferred to the current asset value (Cur.Val) 14 stored in the memory 12. If the current value 14 is less than the value amount to be transferred (Val.), then the controller 10 generates and returns an error message (at 32). Otherwise, the controller 10 decreases the current value (Curr.Val) stored in memory 12 by the amount (Val.) to be transferred (at 34), and then generates (at 36) a value transfer message containing the amount (Val.) to be transferred and a nonce which uniquely identifies the value transfer message, at least among the value transfer messages generated and sent by the controller 10. Finally, the controller 10 records information about the transfer in the log (at 38). In some embodiments, the nonce may be a counter value, the counter being incremented for each successive value transfer message. As noted above, the encryption function 22 of the interface 8 applies a digital signature to the value transfer message (at 40) and then transmits the signed value transfer message to the communications medium 6.

Figure 2B:
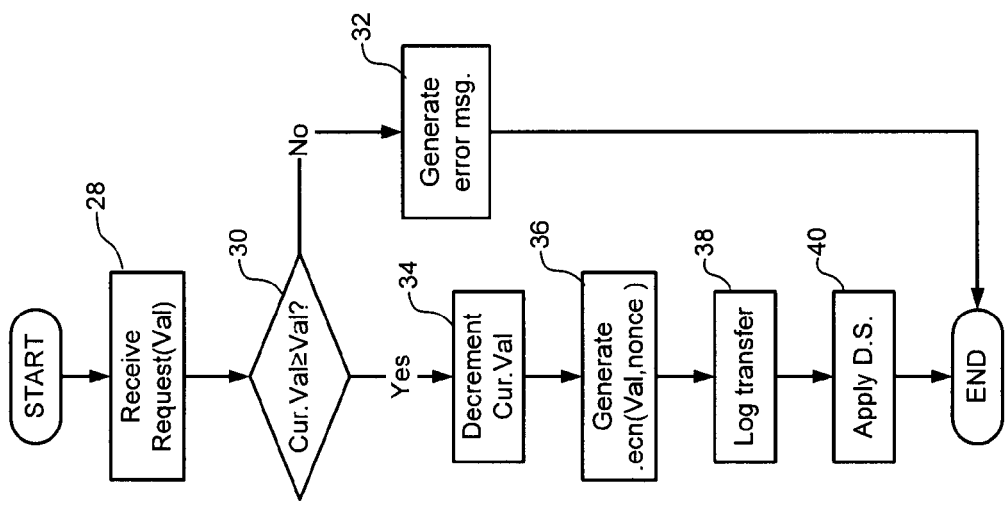

FIG. 2b is a flow-chart showing a representative "transfer In" process which may be executed by the e-Purse 4 to record a transfer of asset value to the e-Purse 4. Referring to FIG. 2b, the transfer-in process begins with reception of a value transfer message (at 42) containing the asset value amount to be transferred, and a nonce. At a first step, the decryption function 24 of the interface 8 uses the public key to verify (at 44) the digital signature of the received value transfer message. If the verification fails, the value transfer message is discarded (at 46), an error message is generated (at 48) and the transfer-in process is terminated. If the verification is successful, the controller 10 uses the nonce to compare (at 50) the received value transfer message with its log 18 to determine whether the value transfer message is a duplicate of a previously received message. If it is a duplicate, the value transfer message is discarded (at 46), an error message is generated (at 48) and the transfer-in process is terminated. Otherwise, the controller 10 records information about the transfer in the log (at 52), and increases the current value (Curr.Val) stored in memory 12 by the amount (Val.) to be transferred (at 54).

As noted above, the log 18 maintains a record of asset transfers into and out of the e-Purse 4. In some embodiments, the information recorded in the log 18 comprises the content of each asset transfer message received of sent by the e-Purse 4. In some embodiments, a digest of each asset transfer message may be recorded in the log 18, rather than the entire content. In some cases, the digest may take the form of a hash computed over at least a portion of the asset transfer message. Recording a hash of received value transfer messages, for example, enables effective detection of duplicate messages while minimizing the amount of memory required to store the log 18. In some embodiments, sent and received asset transfer messages may be recorded in respective separate logs. This arrangement is beneficial in that it facilitates respective different information sets to be recorded in each log 18. For example, the log of sent messages may record the entire content of every value transfer message sent by the e-Purse, while the log of received messages merely records a hash of each received message.

The above description with reference to FIG. 2 describes representative functions executed by the controller 10 to record received asset value and transfer asset value from the e-Purse 4. This description relates only to the specific functions executed by the e-Purse itself. This functionality can be used in various ways to effect asset value transfers between parties, as will be described in greater detail below.

Figure 3:
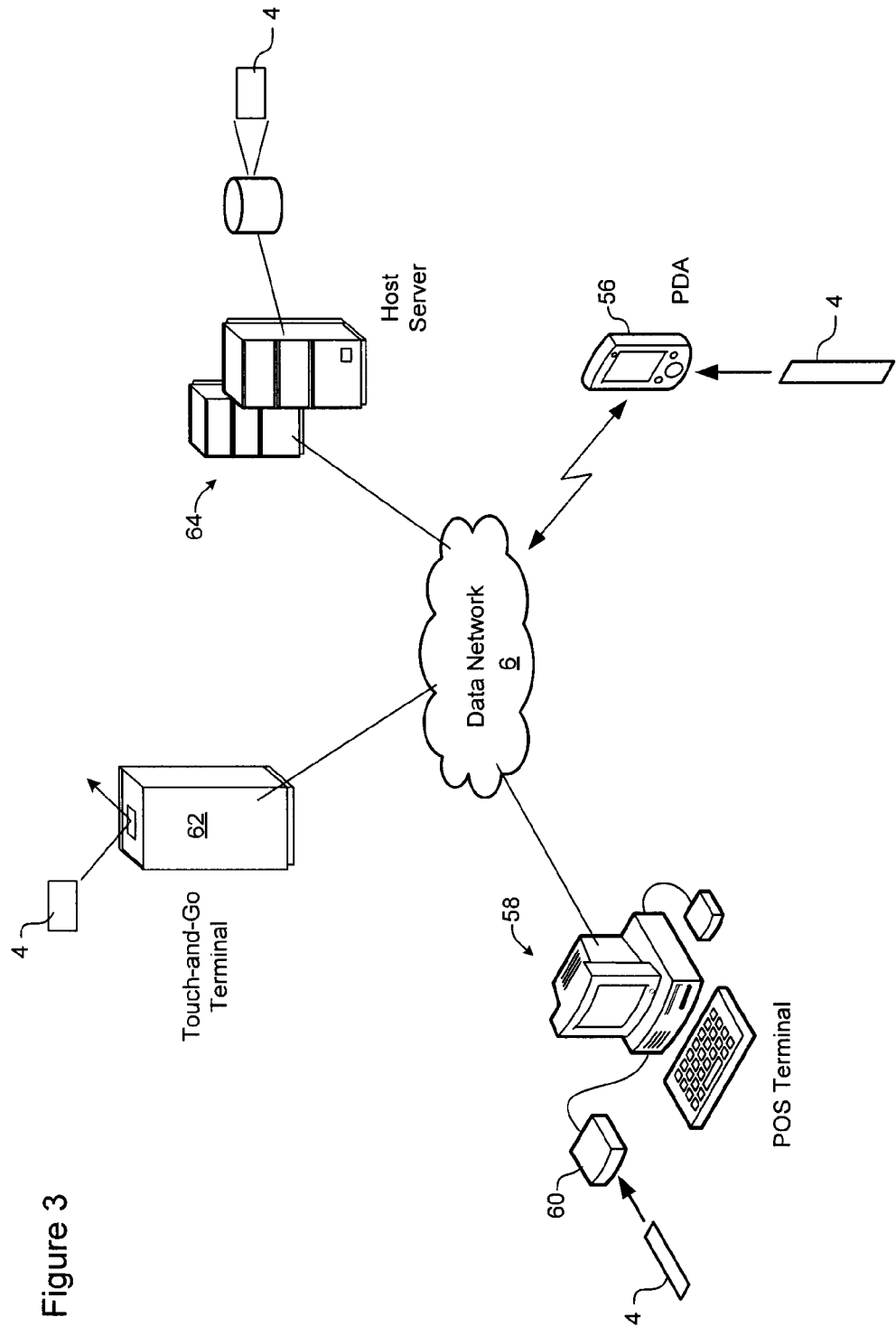
FIG. 3 is a block diagram schematically illustrating a content exchange system in accordance with embodiments of the present invention.

In general, the communications medium 6 can be any suitable combination of hardware and software capable of exchanging messages with the e-Purse 4. In embodiments in which the e-Purse is a virtual e-Purse hosted by a server, the communications medium may be a data network, such as the Internet. In embodiments in which the e-Purse is a physical article, the communications medium will normally be a communications device connected to the e-Purse via the interface, and connected to a data network for communications with other parties. FIG. 3 schematically illustrates a value exchange system which incorporates various representative types of communications devices and e-Purse form factors. In particular, FIG. 3 illustrates a user's personal communication device 56 such as a lap-top, personal data assistant (PDA) or cell-phone used with a physical e-Purse 4(using either a wireless or electrical connector-type interface); a Point-of-Sale (POS) terminal 58 having a "reader" 60 for interfacing with a customer's physical e-Purse 4 (using either a wireless or electrical connector-type interface); a "touch-and-go" terminal 62 used with a physical e-Purse 4 having a wireless interface; and a host server 64 which instantiates and maintains a virtual e-Purse. Operation of each of these arrangements will be described in greater detail below.

In cases where the communications medium 6 is a user's personal communications device 56, the user's physical e-Purse may connect to the communications device 56 using either a wireless or electrical connector-type interface. In e-Purses having an electrical connector-type interface, the interface may be configured to plug into a suitable port of the communications device 56, either directly or via a suitable cable. USB ports are comparatively ubiquitous and can readily be used for this purpose, although any other suitable connector types may equally be used.

Figure 4:
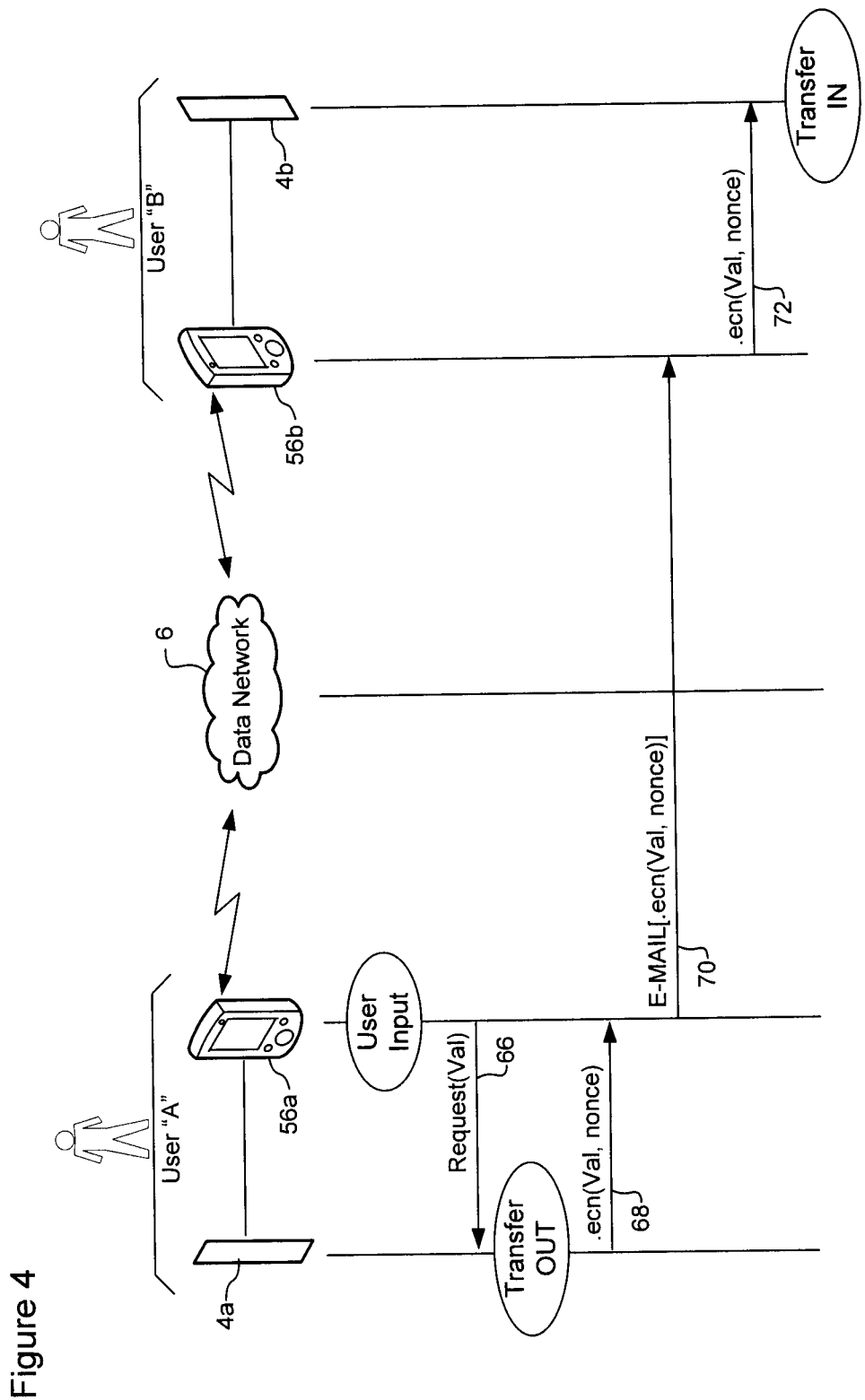
FIG. 4 is a message flow diagram schematically illustrating a process for transferring an desired content amount in a first scenario.

Preferably, a software application (or Applet) is installed on the user's personal communications device 56 to facilitate messaging to and from the e-Purse, and associated transfers of asset value, under control of the user. For example, FIG. 4 illustrates a scenario in which a desired asset value amount is transferred from a e-Purse 4a held by a first user (user "A"), to a e-Purse 4b held by a second user (User "B"). In this scenario, User "A" may launch an applet on their personal communications device 56a, which opens a window on a display screen so that User "A" can enter information indicating the desired value amount that they wish to transfer to User "B". Based on the input information, the Applet may generate a request message 66 containing the value amount to be transferred and send the request to User A's e-Purse via the interface. In response to the received request message, the e-Purse executes the "Transfer-Out" process as described above with reference to FIG. 2a. As noted above, following the "Transfer-Out" process, the e-Purse will return either an error message or a value transfer message 68 containing the value to be transferred. User A may then interact with the Applet to forward (at 70) the value transfer message through the data network to User B. For example, the value transfer message may be sent to User B as an attachment to an e-mail message. When User B receives (in their e-mail in-box, for example) an e-mail message containing the value transfer message, they may then interact with e-mail software and an Applet on their personal communications device 56b to forward the received value transfer message (at 72) to their e-Purse 4b, which then executes the "transfer-In" process described above with reference to FIG. 2b to record the transfer of asset value to the e-Purse 4b.

As may be appreciated, the above-described functionality can be used to transfer a desired asset value amount between any two physical e-Purses 4 hosted by respective communications devices 56 that are capable of exchanging messages through the data network 6. The use of e-mail to effect the message transfer is useful in that e-mail software is readily available and provides robust means for reliable and secure message transfer. It is also beneficial in that the message transfer does not need to be "real-time", and the two parties do not need to establish a dedicated communications link in order to effect the transfer. However, the use of e-mail to effect message transfer is not essential. The sending e-Purse's current value is decremented by the amount being transferred at the time that the value transfer message is generated. The receiving party's e-Purse traps (and discards) duplicates, and increments its current value at the time the value transfer message is received. While these events can occur within the context of a single communications session, this it not necessary. It will also be seen that this operation closely follows the pattern of an exchange of cash legal tender (paper or coins), at least in the sense that it accomplishes an exchange of value between two parties, and does not involve or require the intervention of any third party (such as a bank).

The scenario described above with reference to FIG. 4 assumes that the two parties involved in the exchange of value are human users of their respective (physical) e-Purses 4 and their personal communications devices 56. However, it will be appreciated that this is not essential. For example, User A's e-Purse 4a could be a virtual e-Purse hosted by a remote server. In this case, User A may interact with a client application on the server to send the request message and obtain the desired value transfer message from their (virtual) e-Purse. Similarly, User B's e-Purse can be a virtual e-Purse hosted by a remote server. In this case, User B may interact with a client application on the server to forward the received asset value transfer message from their e-mail application to their (virtual) e-Purse.

Furthermore, it is not necessary for either or both of User A or User B to be human. For example, User A could be an automated system designed to forward payments to User B in accordance with a predetermined schedule. Similarly, User B could be an e-commerce application which receives and forwards the value transfer message to its (virtual) e-Purse as part of an on-line transaction, or any other type of automated payment processing system which receives and processes payments via the data network.

Thus it will be appreciated that the scenario described above with reference to FIG. 4 is equally applicable to the case of an asset transfer between two persons; an asset transfer between an person and an automated payment processing system; or an asset transfer between two automated systems.

In some embodiments, asset values stored on e-Purses may be treated as legal tender. In such cases, a user's bank may provide a facility whereby the user's bank account is represented by a virtual e-Purse. The user's physical e-Purse then can be used as an electronic wallet or purse. With this arrangement, the user can make cash withdrawals and deposits to and from their bank account by transferring asset value amounts between their virtual and physical and e-Purses using, for example, an automated teller machine configured to connect to the user's physical e-Purse, in a manner directly equivalent to conventional methods of cash withdrawal and deposit using a bank access card.

In some embodiments, asset values stored on e-Purses may be accepted as a means of storing and exchanging value, while not being legal tender. For example, e-Purse-based asset values may be treated as coupons or vouchers that are redeemable for merchandise or discounts at selected retailers. In another example, e-Purse-based asset values may be used as a means of value exchange for on-line transactions, such as within an on-line game or social networking environment. In both such cases, a user may purchase a e-Purse with a given asset value amount already stored in its memory 12. Alternatively, a user may purchase a desired asset value amount, for example from a broker, which is transferred to a e-Purse already in the user's possession (e.g. using the method described above with reference to FIG. 4). It is anticipated that a user may also sell some or all of the asset value amount stored on the user's e-Purse to a broker in exchange for legal tender. In this way, brokers can serve as a means by which users can convert legal tender into e-Purse based asset value, and vise versa.

As noted above, in embodiments in which the communications medium is a user's personal communications device (such as a lap-top, PDA or a cell-phone), an applet can be executed on the interaction between the personal communications device to facilitate interaction with the e-Purse. In some embodiments, this applet may be installed on the personal communications device, and launched as desired by the user. In some embodiments, the applet may be launched automatically, for example in response to detection (by the personal communications device) that the e-Purse has been connected to one of the device's I/O ports. In other embodiments, the applet may be stored on the e-Purse itself, and automatically uploaded and launched on the personal communications device when the e-Purse is connected to an I/O port of the personal communications device In embodiments in which the e-Purse is a virtual e-Purse hosted on a remote server, the applet may take the form of a browser application or "plug-in" that enables the user to interact with their virtual e-Purse via web-browser software.

As noted above, the "Transfer-Out" process returns an error message if the desired amount to be transferred exceeds the current value stored in the e-Purse. Similarly, the "Transfer-In" process may return an error message if the received value transfer message is a duplicate. Preferably, the applet used to interact with the e-Purse is designed to display appropriate warnings and/or prompts to a user in response to these error messages. In some embodiments, additional messages may be exchanged between the applet and the e-Purse, to facilitate use of the e-Purse by a user.

For example, when the applet is launched on the user's personal communications device, it may automatically send a status request message to the e-Purse. In response, the e-Purse may return a status check message which includes the current asset value stored in the e-Purse. Upon receipt of the status check message, the applet may display the current asset value on a display of the user's personal communications device. If no response is received within a predetermined time, the applet may determine that the e-Purse is either not connected or not functioning properly, and display an appropriate warning on the display of the personal communications device.

If desired, the applet may also enable the user to send a log record request message to the e-Purse, in response to which the e-Purse returns a log record message containing the contents of the log stored in the e-Purse's memory 12. In some embodiments, the applet may further enable this log record message, or the log contents within it, to be uploaded to an accounting application so that the user may maintain a personal record of their expenditures.

Figure 5:
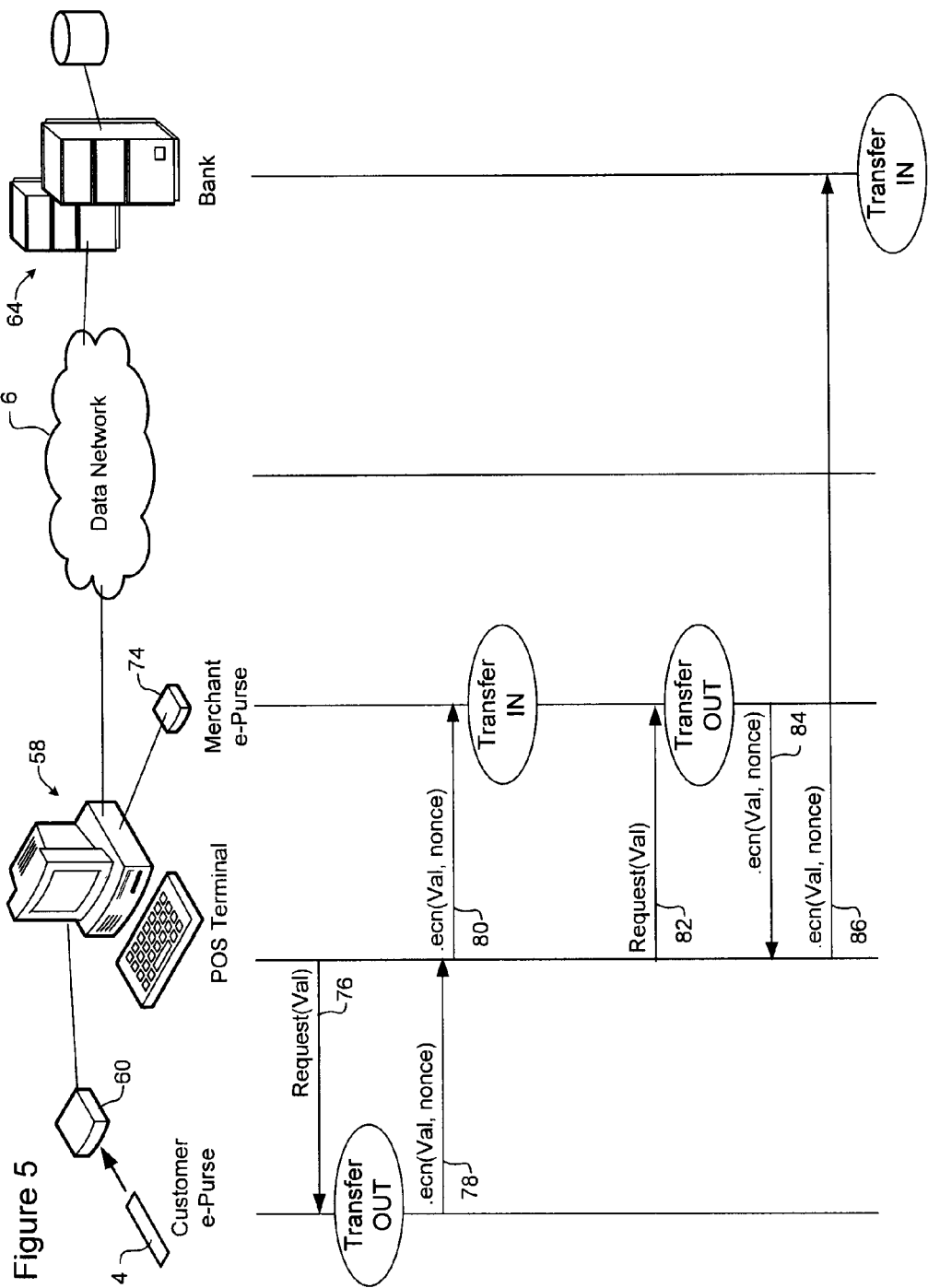
FIG. 5 is a message flow diagram schematically illustrating a process for transferring an desired content amount in a second scenario.
Figure 6:
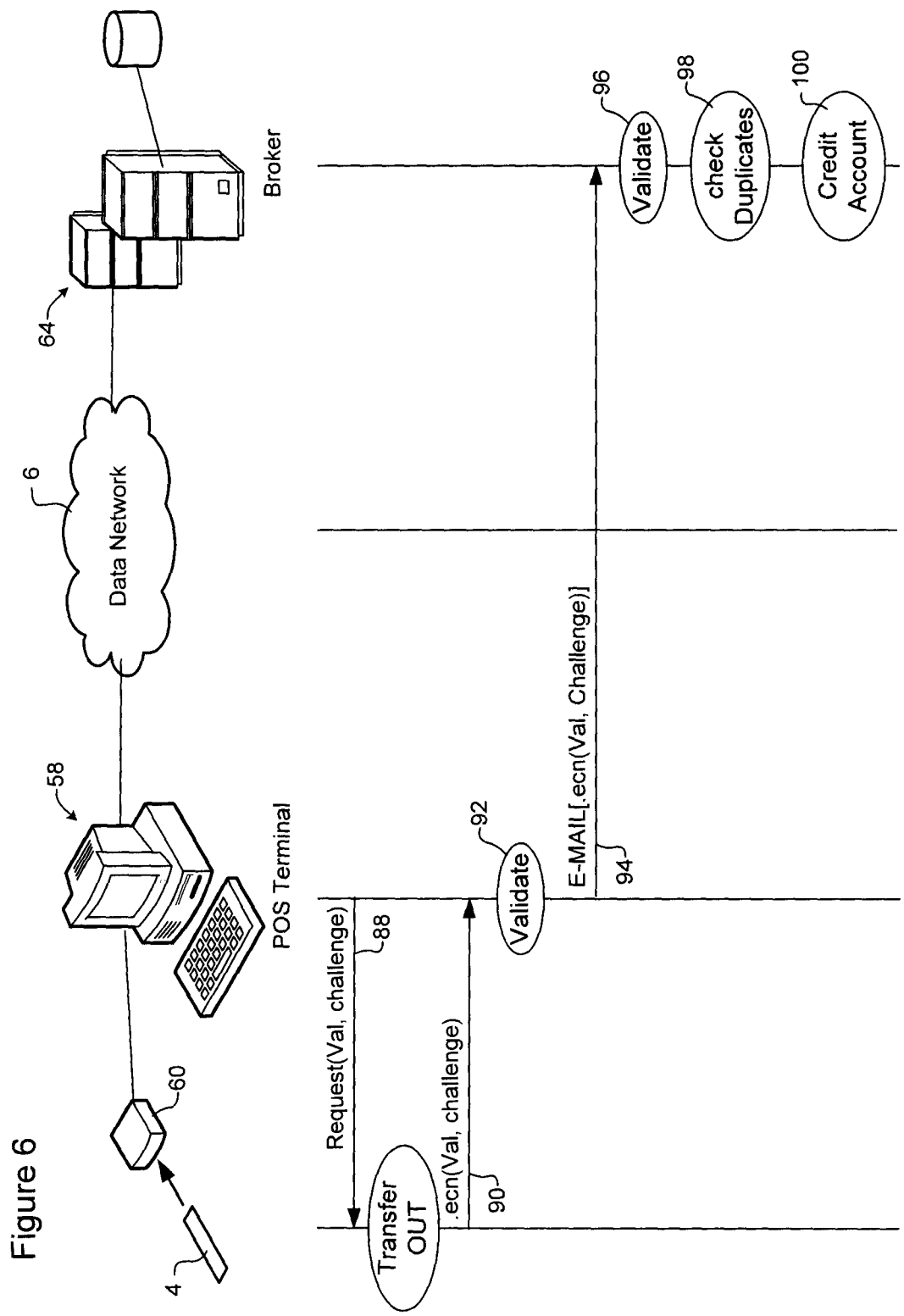
FIG. 6 is a message flow diagram schematically illustrating a process for transferring an desired content amount in a third scenario.

FIGS. 5 and 6 show respective message flows for handling asset value transfers between a customer and a merchant, for example as part of a purchase transaction.

The message flow of FIG. 5 relates to a scenario in which a Point of Sale (POS) terminal 58 is used to transfer a desired asset value amount from an e-Purse held by a customer, to a local e-Purse 74 held by the merchant.

As may be seen in FIG. 5, the POS terminal 58 includes a reader device 60 designed to establish a connection between the POS terminal 58 and the customer's physical e-Purse 4 using either a wireless or electrical connection. The merchant's local e-Purse 74 may be provided as a peripheral device connected to an I/O port of the POS terminal 58. If desired, the merchant's local e-Purse 74 may by used to support asset value transfers controlled by a single POS terminal 58, or a cluster of two or more POS terminals at a given retail location, for example. The merchant's local e-Purse 74 can be a physical device connected to the POS terminal 58 as shown in FIG. 5, or may be a virtual e-Purse hosted on a remote server. In the case of a virtual e-Purse, the POS terminal 58 may be designed to interact with the e-Purse via a secure link to the remote server, for example using a browser application.

The POS terminal 58 executes an application which allows the merchant to enter purchase amounts in a conventional manner, and calculate a total asset value to be transferred from the customer's e-Purse. The POS application may then generate a request message (at 76) containing the value amount to be transferred and send the request to the customer's e-Purse 4 via the reader device 60. In response to the received request message, the customer's e-Purse 4 executes the "Transfer-Out" process as described above with reference to FIG. 2a. As noted above, following the "Transfer-Out" process, the customer's e-Purse 4 will return (at 78) either an error message or a value transfer message containing the value to be transferred. Upon receipt of the value transfer message, the POS application may then forward (at 80) the received value transfer message to the merchant's local e-Purse 74, which then executes the "transfer-In" process described above with reference to FIG. 2b to record the transfer of asset value. Naturally, if it is desired to refund an amount to the customer, this process can be reversed.

As may be appreciated, this arrangement enables the POS terminal 58 to perform all of the normal cash-sale operations of a conventional POS terminal, using asset value amounts stored in customers' e-Purses rather than cash legal tender. The log stored in the memory of the merchant's local e-Purse 74 contains a complete record of electronic asset value transactions, which can be retrieved by the merchant and used for record keeping and accounting purposes, as desired.

It is anticipated that a merchant may desire to provide its customers with physical e-Purses 4, and use e-Purse-based asset value transactions in a manner directly analogous to the conventional use of coupons or vouchers that are redeemable for merchandise or in-store discounts. In such cases, the physical e-Purses 4 provided by the merchant may be configured such that they will only recognise and interact with the merchant's POS terminals 58. This selective operation may be accomplished by various means including, but not limited to: designing the e-Purses 4 with a proprietary interface 8; designing the e-Purses 4 with a proprietary encryption algorithm or pair of keys unique to the merchant; and configuring the controller 10 such that it will only respond to request messages that include a predetermined code-word that is known only to the merchant. For example, each of the transfer-in and transfer out processes of FIG. 2 may be modified to include steps of checking received messages for the presence of a code-word, and if it is found, determining whether or not the code-word is valid (for example by comparing it to a value previously stored in memory 12). If the code-word is found to be valid, the rest of the transfer-in and transfer out processes proceed normally. If the code-word is found to be invalid, an error message may be sent, and the transfer-in and transfer out processes terminate.

In embodiments in which e-Purse-based asset values are recognized as legal tender, the merchant may desire to transfer some or all of the asset value amount stored on their local e-Purse to their bank account. Thus, referring back to FIG. 5, the merchant can interact with their POS terminal to enter the amount to be transferred. The POS terminal then generates and sends (at 82) an appropriate request message containing the entered amount to the merchant's local e-Purse 74, which responds by returning a value transfer message (at 84) to the POS terminal 58 in the manner described above with reference to FIG. 2*a*. This value transfer message can then be sent (either automatically, or in response to user input to the POS terminal) to the merchant's virtual e-Purse which has previously been set up to represent their bank account, which results in the deposit of the asset value amount in the merchant's bank account.

In embodiments in which e-Purse-based asset values are not recognized as legal tender, the merchant may desire to sell some or all of the asset value amount stored on their local e-Purse 74 to a broker, in exchange for legal tender. Substantially the same method as described above can be used to perform this transaction, but in this case, the value transfer message returned by the merchant's local e-Purse 74 (at 84) may be sent to the broker as an attachment to an e-mail, and the broker may then use conventional methods of electronic funds transfer to deposit an amount of legal tender into the merchant's bank account as part of the transaction.

In the embodiments described above with reference to FIG. 5, asset value amounts transferred from customers' e-Purses 4 are stored in the merchant's local e-Purse 74, and then some or all of this stored asset value is subsequently sent to the merchant's bank account (virtual e-Purse) or a broker for conversion to legal tender. In some cases, this arrangement is useful in that successful completion of the transfer-in process by the merchant's local e-Purse 74 provides immediate confirmation that the intended asset value amount has been transferred to complete the purchase transaction. However, the need to set up and manage one or more local e-Purses 74 may be undesirably inconvenient for the merchant. FIG. 6 illustrates an embodiment which avoids this difficulty.

In the embodiment of FIG. 6, the merchant contracts with a broker who provides asset transfer services. The merchant's POS terminal 58 is then provided with the public key and a software application that enables the POS application to verify asset transfer messages returned from customers' e-Purses 4. During a purchase transaction, the merchant enters purchase amounts in a conventional manner, and calculates a total asset value to be transferred from the customer's e-Purse 4, all in the same manner as described above with reference to FIG. 5. The POS application then generates a request message (at 88), which in this case contains the value amount to be transferred and a challenge word. The challenge word can be any alphanumeric string that is unique, at least among the asset value transfer request messages sent by the POS terminal 58. When the request message is received by a customer's e-Purse 4, it executes the "Transfer-Out" process as described above with reference to FIG. 2*a*, and upon successful completion returns (at 90) a value transfer message containing at least the value to be transferred, the challenge word and a unique identifier of the customer's e-Purse. In some embodiments, the returned value transfer message may also include a nonce generated by the customer's e-Purse 4 to enable detection of duplicate messages by the broker. In other embodiments, the challenge word may be used for this purpose, in which case the nonce generated by the customer's e-Purse 4 may only be used in the e-Purse's log 18, and the returned value transfer message will not include the nonce. Upon receipt of the value transfer message, the POS application can check the digital signature (at 92) to verify the value transfer message, and examine the challenge word. If the verification is successful and the returned challenge word matches that sent to the customer's e-Purse 4, then the merchant can conclude that the customer's e-Purse 4 is operating properly, and has issued a valid value transfer message. The (encrypted/signed) value transfer message can then be forwarded (at 94) from the POS terminal to the broker, for example as an attachment to an e-mail. Upon receipt of the value transfer message, a broker application verifies the value transfer message (at 96); checks the e-Purse identifier and nonce (at 98) to detect duplicate copies of the value transfer message, and then credits the asset value amount in the value transfer message to the merchant's account (at 100). This latter operation may be performed either by transferring the asset value amount to a virtual e-Purse representing the merchant's bank account, or a conventional electronic funds transfer of legal tender to merchant's bank account, as desired.

In the embodiments described above with reference to FIGS. 5 and 6, a purchase transaction is controlled by a POS terminal 58, for example at a merchant's retail outlet. However, it will be appreciated that substantially identical processes can be used to handle transactions at a "touch-and-go" terminal 62, for example to handle a transit fare payment at a bus or sub-way terminal. In this case, however, the value amount to be transferred is known in advance, so that the "touch-and-go" terminal 62 can send the transfer request message immediately upon detection that a e-Purse 4 has successfully connected to its interface. Generation of the value transfer message by the e-Purse 4, and subsequent handling of the value transfer message can be substantially identical to that described above with reference to FIGS. 5 and 6, with the "touch-and-go" terminal operating automatically in place of the manually operated POS terminal 58. In both of these scenarios, the "touch-and-go" terminal verifies the value transfer message returned by the e-Purse 4. If desired, this verification step may be used to control a turnstile or other restricted access system, so that a user of the e-Purse is prevented from proceeding if the asset value transfer fails.

An advantage of this arrangement is that the "touch-and-go" terminal can issue the transfer request message, and receive and verify the returned asset value transfer message within a very short period of time. In many cases, this will enable commuters at a sub-way station, for example, to pay their transit fare without incurring any significant delay, thereby maximizing the convenience for the commuter, while at the same time minimizing the transaction costs incurred by the transit authority.

As described above, in some embodiments a merchant may use a proprietary code-word to enable selective operation of e-Purses, for example to facilitate use of e-Purse-based asset values as vouchers or coupons redeemable for merchandise or discounts. This same principle can be applied to define communities of interest, and enable a given e-Purse to exchange asset value amounts only with other e-Purses within that community of interest. For example, consider an example in which asset value amounts are (at least nominally) denominated in the currency of a given country. It would be desirable to limit the exchange of asset value amounts between e-Purses whose asset values are denominated in that same currency. Thus, a community of interest may be defined for asset values denominated in British Pounds, and another community of interest defined for asset values denominated in Canadian Dollars. The e-Purses used in both communities of interest may be identical, but exchanges of value restricted to each community of interest by issuing respective different code-words (which in this example would take the form of currency indicators) to each community. With this arrangement, an asset value transfer message issued by a e-Purse within the "Canadian Dollars" community of interest could not be successfully received and processed by a e-Purse within the "British Pounds" community of interest, for example. If desired, a user could acquire e-Purses for two or more communities of interest, and transfer asset value amounts between them (and so effectively completing a currency exchange transaction), using a broker who provides that service. As may be appreciated, the denomination of asset values in terms of the legal currency of a given nation provides a convenient method of representing asset value amounts, independently of whether or not e-Purse-based asset values are considered to be legal tender. Thus the foregoing example is not limited to cases in which e-Purse-based asset values are considered to be legal tender. Furthermore, it will be appreciated that the use of communities of interest is not limited to preventing transfers between e-Purses whose asset values are denominated in different national currencies. Rather any desired criteria may be used to define a community of interest, and limit e-Purses within that community of interest to asset value transfers with other e-Purses within that community of interest.

In the embodiments described above with reference to FIGS. 2-6, an e-Purse receives a transfer request message containing an asset value amount to be transferred, and returns either an error message or an asset value transfer message containing the asset value amount to be transferred. In some cases, this operation may be undesirable, because a user must either employ their own communications device 56 to generate the transfer request message (as illustrated in FIG. 4), or else trust that the other party (e.g. a merchant's POS system 58 or Touch-and-go terminal 62) provides a request message with the correct amount of asset value to be transferred. In embodiments in which a physical e-Purse includes a display 26 and a user input device (such as a touch-screen), as described above with reference to FIG. 1b, this limitation can be overcome by configuring the controller 10 to accept a user input of the amount to be transferred. When the e-Purse subsequently receives the transfer request message (e.g. from a POS terminal, as shown in FIGS. 5 and 6), the controller 10 can compare the value amount contained in the request message with the amount input by the user. If the two amounts match, then the controller 10 executes the Transfer-out process to transfer the requested amount, as described above. Otherwise, the controller 10 can either ignore the received request message, or transmit an error message.

Figure 7:
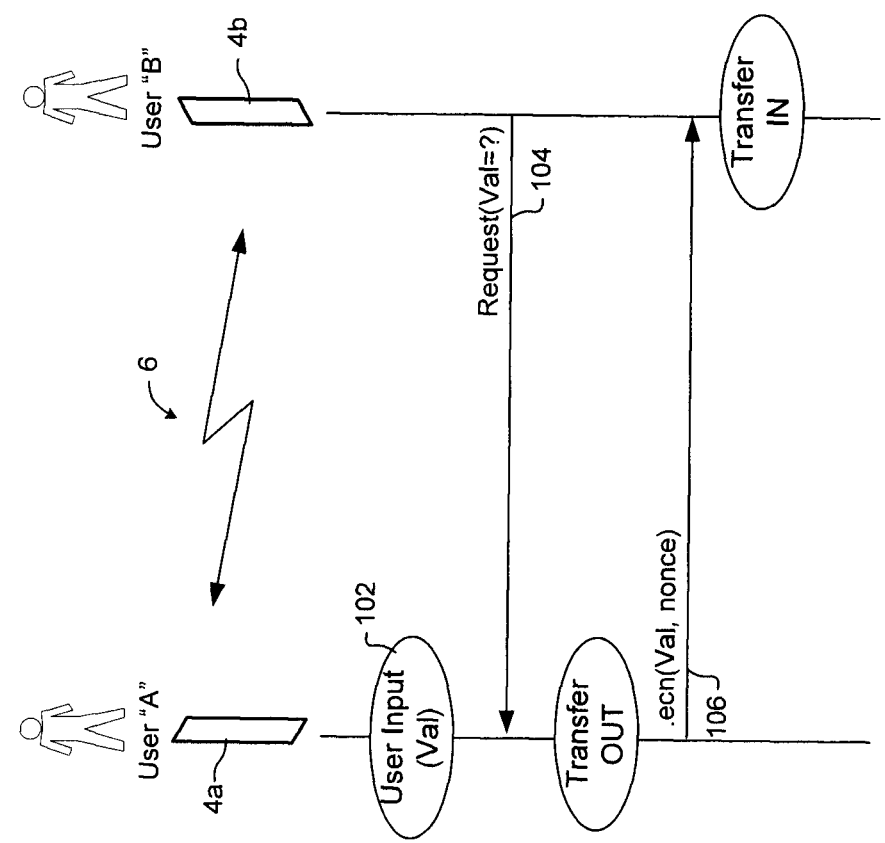
FIG. 7 is a message flow diagram schematically illustrating a process for transferring an desired content amount in a fourth scenario.

In an alternative scenario, a POS terminal can be configured to generate a transfer request message containing a "null" value for the asset value amount to be transferred. In this scenario, the controller 10 would the execute the Transfer Out process largely as described above, but inserting the asset amount input by the user into the value transfer message rather than using the value contained in the transfer request message, In this case, the POS application executing on the POS terminal 58 can compare the asset value amount contained in the asset transfer message to the total amount required to be paid. If these two values match, the POS application can issue a receipt to the customer to complete the sale transaction. If desired, the POS terminal 58 can be configured to generate a "null" transfer request message automatically upon detection of the customer's physical e-Purse 4 by the reader 60. This operation results in an exchange which proceeds in a manner that very closely follows a conventional cash sale transaction, in which the POS terminal calculates a total sale price, the customer then offers cash to the sales clerk, and the sale transaction is completed when the amount offered by the customer matches the total sale price calculated by the POS terminal. As a result, the advantages of and familiarity of conventional cash sales transactions are obtained, but without the inconvenience of having to handle paper and coin legal tender FIG. 7 illustrates a scenario in which a desired asset value amount is transferred from a physical e-Purse 4a held by a first user (user "A"), directly to a physical e-Purse 4b held by a second user (User"B"). In this scenario at least user A's e-Purse 4a includes a display 26 and a user input device (such as a touch-screen), and both e-Purses are provided with a wireless interface. Referring to FIG. 7, User "A" inputs an amount to be transferred (at 102), and then positions their e-Purse 4a into close proximity to User B's e-Purse 4b. When the two e-Purses are close enough to establish a wireless link, User B's e-Purse 4b transmits a transfer request message (at 104) having a null value for the amount to be transferred. Upon receipt of the "null" transfer request message, User A's e-Purse 4a executes the Transfer-out process, as described above, to generate (at 106) an asset transfer message which contains the amount to be transferred that was previously input by User A. When User B's e-Purse 4b receives the value transfer message, it automatically executes the "transfer-In" process as described above to record the transfer of asset value to the e-Purse.

This scenario is particularly suitable for voluntary asset transfers between two people, such as, for example, in the case of a customer wishing to tip a bell-hop in a hotel. As described above, User A initiates the value transfer, and selects the amount to be transferred. User A also controls the recipient, by placing their e-Purse in close proximity with the e-Purse to which the selected asset value amount is to be transferred. In this case, security of the transfer is maintained because User A's e-Purse 4a will only respond to a received transfer request message containing a null value after the amount to be transferred has been entered, and then will only transmit a single asset transfer message in response to a received transfer request message. Furthermore, the asset transfer will only occur once the two e-Purses have been brought into close proximity. As a result, the probability of unwanted asset transfers from User A's e-Purse is extremely low.

In the scenario of FIG. 7, user B's e-Purse 4b responds to the presence of user A's e-Purse by transmitting a transfer request message. This function requires that user B's e-Purse be able to detect the presence of User A's e-Purse 4a within range of its wireless interface. Various methods may be used to accomplish this. For example, once user A has entered the amount to be transferred, user A's e-Purse may begin to transmit a predetermined hand-shake signal. User B's e-Purse may then respond to detection of the handshake signal, by generating the transfer request message. Other techniques will be apparent to those of ordinary skill in the art. and may be used without departing from the intended scope of the appended claims.

In the foregoing description, aspects of the present invention have been described with reference to embodiments in which the secure storage and transfer mechanism is used to enable electronic commerce via the secure storage and exchange of message content in the form of an asset value or a monetary amount. However, it will be recognised that the present invention is not limited to electronic commerce, but rather that the same techniques may be used to implement a a secure communications system in which the values of Security, Irrevocability, Non-repudiation and Duplicate Detection are desired.

In particular, there is no inherent limitation in the nature of the message content. As noted above, in an e-commerce context, the message content represents an asset value or monetary amount. In an electronic voting context, the message content may represent the user's vote. In an electronic rights context, the message content may represent a right or authorization possessed by the user, such as a ticket, voucher or invitation to attend a specific event, for example. In any of these contexts, the above-described features of storing and decrementing the current content (Cur.Val) of the storage media 4 is useful, because it supports irrevocability, and prevents improper generation of value transfer messages. Thus, for example, a user is prevented from generating value transfer messages containing (in aggregate) more asset value than was stored in memory 12, or more votes than they are authorized to cast, or more tickets (e.g. to an event) than they had purchased. Similarly, a vendor (e.g. a re-seller of tickets to entertainment events) can be prevented for selling more tickets than they were authorized to sell.

In the foregoing description, the invention is described by way of examples in which the storage media 4 is used to store and transfer content, all of which is of a given type. Thus, for example, in an e-commerce context, the message content represents an asset value or monetary amount, and the storage media 4 is referred to as an e-Purse. However, it will be appreciated that the memory 12 of the storage media 4 may be used to store multiple different types of message content simultaneously. Thus, for example, a user's storage media 4 (e-Purse) could contain current content in the form of an asset value (monetary) amount, two electronic theatre tickets, and a voting right for an up-coming election. It will be appreciated that this scenario may be readily accommodated by storing respective different current value (Cur.Val.) "buckets" in the memory 12, and modifying the transfer-in and Transfer-out processes described above to utilize the appropriate bucket for any given transaction. For example, in some embodiments, the request message used to trigger execution of the transfer-out process may contain a parameter specifying the current value bucket to be used for the transaction, and the resulting value transfer message may also contain this same parameter value so that the transfer-in process can operate to increment the appropriate current value bucket in the recipient's storage media 4.

In some embodiments, it may be desirable to implement a duplicate checking function as part of the Transfer-out process (FIG. 2a). Thus, for example, it may be desirable to ensure that the controller 10 can detect (and reject) a duplicate transfer request message, and so avoid a problem in which issuing two or more value transfer messages are generated in response to a single transfer request. It will be appreciated that a suitable duplicate checking mechanism can be implemented that effectively mirrors that described above for transfer messages. For example, in the embodiment described above with reference to FIG. 6, the Transfer-Out process is performed in response to a transfer request message that contains a challenge word generated by the POS terminal. In the embodiment of FIG. 6, this challenge word is used by the POS terminal to validate the subsequently received value transfer message. However, it will be appreciated that the controller 10 of the storage media 4 may also use the challenge to detect, and reject, duplicate transfer requests. For this purpose, at the conclusion of each successful transfer-out process, the controller 10 may store the challenge word in the log 18, for example at step 38 of FIG. 2a. This information enables controller 10 to detect subsequent duplicate request messages, by comparing the challenge word of a newly received request message to the challenge words already stored in the log 18. If a match is found, the newly received request message can be rejected as a likely duplicate, and an appropriate error message can be generated and returned by the controller 10. Otherwise, the transfer-out process can proceed as described above with reference to FIG. 2a. If desired, other data fields of the transfer request message (such as, for example, recipient ID, value, currency, etc.) may also be used in addition to the challenge, to identify duplicates.

The embodiment(s) of the invention described above is(are) intended to be exemplary only. The scope of the invention is therefore intended to be limited solely by the scope of the appended claims.

I claim:

1. An apparatus for storing and transferring content, the apparatus comprising:
    an interface configured to send and receive messages through a communications medium, the interface including a first cryptographic function for protecting messages being sent, and a second cryptographic function for verifying received messages;
    a memory storing at least a current content, a respective unique identifier of the storage media, and a log of content transfers; and
    a controller operatively coupled to the interface and the memory, the controller operating under control of instruction code to execute a Transfer-In process to record a transfer of message content to a storage media, and to execute a Transfer-Out process to record a transfer of message content from the storage media:
    wherein the Transfer-In process comprises steps of:
    receiving, via the interface, a content transfer message including at least a message content to be transferred;
    determining, using the second cryptographic function, a validity of the received content transfer message;
    determining, using the log, whether the received content transfer message is likely a duplicate;

responsive to determination that the received content transfer message is valid and is likely not a duplicate, increasing the current content by the message content to be transferred and recording information of the content transfer in the log; and responsive to determination that either the received content transfer message is invalid or is likely a duplicate, discarding the content transfer message; and wherein the Transfer-Out process comprises steps of:

receiving, via the interface, a content transfer request message including at least a message content to be transferred;

determining whether the current content is equal to or greater than the message content to be transferred, and generating an error message responsive to determination that the current content is not equal to or greater than the message content to be transferred, and otherwise generating a content transfer message including the message content to be transferred, decreasing the current content by the message content amount to be transferred; recording information of the content transfer in the log, and using the first cryptographic function to protect the generated content transfer message; and wherein the information recorded in the log comprises a digest of each transfer message and each transfer request message contains a challenge word, and wherein detecting a likely duplicate transfer request message comprises:

for each content transfer process completed by the controller, storing the challenge word contained in the respective transfer request message, as part of the information of the content transfer stored in the log; and upon receipt of a new transfer request message, comparing the respective challenge word contained in the new transfer request message to challenge words already stored in the log.

2. The apparatus as claimed in claim 1, wherein each storage media comprises any one of:

a physical storage media; and a virtual storage media instantiated and maintained by a server.

3. The apparatus as claimed in claim 1, wherein the communications medium comprises any one or more of:

a network;

a communications device connected to the network and connected to a respective storage media via the interface, the communications device hosting the storage media for communications through the network; and a direct link between the storage media and a terminal or another storage media.

4. The apparatus as claimed in claim 3, wherein the network is the internet.

5. The apparatus as claimed in claim 3, wherein the communications device is selected from the list comprising Personal Data Assistants (PDAs); cell phones, hand-held computers and lap-top computers.

6. The apparatus as claimed in claim 3, wherein the direct link is a wireless link.

7. The apparatus as claimed in claim 3, wherein the terminal is selected from the list comprising merchant's point-of-sale devices, self-service kiosks and "touch-and-go" terminals.

8. The apparatus as claimed in claim 1, wherein the first cryptographic function comprises applying a digital signature to the message being sent, and wherein the second cryptographic function comprises determining a validity of a digital signature included in a received message.

9. The apparatus as claimed in claim 1, wherein the digest comprises a hash of the respective transfer message.

10. The apparatus as claimed in claim 1, further comprising a display operatively connected to the controller, such that the controller can display information including the current content.

11. The apparatus as claimed in claim 10, wherein the display is a touch-screen for receiving user input.

12. The apparatus as claimed in claim 10, further comprising at least one button for receiving user input.

13. The apparatus as claimed in claim 10, wherein the transfer-out process comprises comparing the message content to be transferred to a user-input content, and generating the transfer message only if the message content to be transferred matches the user-input content.

14. The apparatus as claimed in claim 10, wherein the received transfer request message includes a message content to be transferred having a null value, and wherein the transfer-out process comprises generating the transfer message using the user-input content as the message content to be transferred.

15. An electronic content exchange system comprising:

a communications channel; and at least two apparatuses, each apparatus comprising:

an interface configured to send and receive messages through a communications medium, the interface including a first cryptographic function for protecting messages being sent, and a second cryptographic function for verifying received messages;

a memory storing at least a current content, a respective unique identifier of storage media, and a log of content transfers; and a controller operatively coupled to the interface and the memory, the controller operating under control of instruction code to execute a Transfer-In process to record a transfer of message content to the storage media, and to execute a Transfer-Out process to record a transfer of message content from the storage media:

wherein the Transfer-In process comprises steps of:

receiving, via the interface, a content transfer message including at least a message content to be transferred;

determining, using the second cryptographic function, a validity of the received content transfer message;

determining, using the log, whether the received content transfer message is likely a duplicate;

responsive to determination that the received content transfer message is valid and is likely not a duplicate, increasing the current content by the message content to be transferred and recording information of the content transfer in the log; and responsive to determination that either the received content transfer message is invalid or is likely a duplicate, discarding the content transfer message; and wherein the Transfer-Out process comprises steps of:

receiving, via the interface, a content transfer request message including at least a message content to be transferred;

determining whether the current content is equal to or greater than the message content to be transferred, and generating an error message responsive to determination that the current content is not equal to or greater than the message content to be transferred, and otherwise generating a content transfer message including the message content to be transferred, decreasing the current content by the message content amount to be transferred; recording information of the content transfer in the log, and using the first cryptographic function to protect the generated content transfer message; and wherein the information recorded in the log comprises a digest of each transfer message and each transfer request message contains a challenge word, and wherein detecting a likely duplicate transfer request message comprises:

for each content transfer process completed by the controller, storing the challenge word contained in the respective transfer request message, as part of the information of the content transfer stored in the log; and upon receipt of a new transfer request message, comparing the respective challenge word contained in the new transfer request message to challenge words already stored in the log.

* * * * *